United States Patent
Rebhan et al.

(10) Patent No.: US 8,793,999 B2
(45) Date of Patent: Aug. 5, 2014

(54) PROCESS FOR STARTING AN INTERNAL-COMBUSTION ENGINE AND AN INTERNAL-COMBUSTION ENGINE HAVING A STARTING-AID DEVICE

(75) Inventors: Stephan Rebhan, Munich (DE); Manuel Marx, Weichs (DE); Guang Rao, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 257 days.

(21) Appl. No.: 13/316,070

(22) Filed: Dec. 9, 2011

(65) Prior Publication Data

US 2012/0144826 A1  Jun. 14, 2012

(30) Foreign Application Priority Data

Dec. 10, 2010 (DE) .......................... 10 2010 054 049

(51) Int. Cl.
  *F02B 33/44* (2006.01)
(52) U.S. Cl.
  USPC ........................................... 60/611; 60/605.1
(58) Field of Classification Search
  USPC ................... 60/611, 605.1; 123/90.15–90.17; 701/102, 103
  See application file for complete search history.

(56) References Cited

U.S. PATENT DOCUMENTS

| | | | |
|---|---|---|---|
| 4,878,462 A * | 11/1989 | Kurisu et al. | 123/90.17 |
| 6,763,791 B2 * | 7/2004 | Gardner et al. | 123/90.17 |
| 7,665,302 B2 | 2/2010 | Nemeth et al. | |
| 8,381,521 B2 * | 2/2013 | Schaffeld et al. | 60/608 |
| 8,412,424 B2 * | 4/2013 | Schaffeld et al. | 701/54 |
| 8,428,844 B2 * | 4/2013 | Schaffeld et al. | 701/103 |
| 8,468,824 B2 * | 6/2013 | Schaffeld et al. | 60/611 |
| 8,484,971 B2 * | 7/2013 | Schaffeld et al. | 60/611 |
| 8,505,297 B2 * | 8/2013 | Schaffeld et al. | 60/611 |
| 2012/0297769 A1 * | 11/2012 | Gerum | 60/611 |
| 2013/0104541 A1 * | 5/2013 | Baumgartner | 60/605.1 |

FOREIGN PATENT DOCUMENTS

| | | | | |
|---|---|---|---|---|
| DE | 3821935 A1 * | 2/1990 | | F02B 23/00 |
| DE | 199 51 597 C1 | 3/2001 | | |
| DE | 10 2008 000 325 A1 | 8/2009 | | |
| WO | WO 2006/089779 A1 | 8/2006 | | |

OTHER PUBLICATIONS

Machine translation of DE102008000325A1 filed on Feb. 18, 2008 (provided in applicant's IDS filed Feb. 23, 2012) obtained from epo.org.*

German Office Action dated Aug. 11, 2011 including English-language translation (Eleven (11) pages).

* cited by examiner

*Primary Examiner* — Thai Ba Trieu
*Assistant Examiner* — Ngoc T Nguyen
(74) *Attorney, Agent, or Firm* — Crowell & Moring LLP

(57) ABSTRACT

A process is provided for starting an internal-combustion engine, particularly a Diesel engine, having an exhaust gas turbocharger and an inlet gas supply device with at least one compressed-air reservoir which is connected with an intake pipe of the internal-combustion engine. During the starting of the internal-combustion engine, additional air is blown from the inlet gas supply device into the intake pipe until a rotational speed of the internal-combustion engine reaches a previously definable idling speed.

20 Claims, 4 Drawing Sheets

PROCESS FOR STARTING AN INTERNAL-COMBUSTION ENGINE AND AN INTERNAL-COMBUSTION ENGINE HAVING A STARTING-AID DEVICE

CROSS-REFERENCE TO RELATED APPLICATION

This application claims priority under 35 U.S.C. §119 from German Patent Application No. DE 10 2010 054 049.8, filed Dec. 10, 2010, the entire disclosure of which is herein expressly incorporated by reference.

BACKGROUND AND SUMMARY OF THE INVENTION

The invention relates to a process for starting an internal-combustion engine. The invention further relates to an internal-combustion engine having a starting-aid device.

Internal-combustion engines (such as Otto and Diesel engines) are less inclined to start at lower temperatures. In order to ensure a robust start of the internal-combustion engine, excessively increased quantities of fuel, among other things, are fed ("lubricating"). Major amounts of undesirable pollutants, such as smoke particulates and HC (hydrocarbons) are therefore generated during a cold-starting operation. In most relevant emission cycles, the internal-combustion engine is to be cold-started at least once. The emissions produced during the brief cold-starting operation correspond to a considerable fraction of what the internal-combustion engine emits as harmful exhaust gases during the entire emission cycle. It is therefore a challenge to developers of internal-combustion engines to, on the one hand, ensure the cold-starting capability of the internal-combustion engine and, on the other hand, minimize undesirable pollutants during the starting operation. Furthermore, start-stop systems for internal-combustion engines are increasingly used for improving energy efficiency. These start-stop systems require a starting of the internal-combustion engine that is as fast as possible.

As a rule, internal-combustion engines have an electric starter motor ("starter") that is coupled by way of a wheel gear or belt gear and has an output just sufficient for securely starting the internal-combustion engine. Here, the dimensioning, on the one hand, is a result of the cost of the starter and, on the other hand, is limited by the available power from the current source (vehicle battery). This is illustrated in FIG. 1 by a diagram of a course of a speed n over the time t during the start of an internal-combustion engine according to the state of the art. A firing speed or starting speed $n_a$ of the internal-combustion engine is therefore always below its idling speed $_z$, which necessitates a start of the combustion operation below the stable speed limit that is defined by the idling speed $n_z$. In a starting device operation AV1, the starter will drive the internal-combustion engine until it reaches the starting speed $n_a$. Then, an ignitable fuel-air mixture will be ignited at a point in time t1 (in the case of an Otto engine, by applied ignition; in the case of a Diesel engine, by self-ignition), which is indicated by a lightning symbol. For this purpose, this fuel-air mixture may also only be injected into the combustion chamber when the starting speed $n_a$ has been reached. After that, the combustion will start. The starter is switched off beforehand, and the speed n of the internal-combustion engine decreases again to a point in time t2, until the internal-combustion engine or the engine is accelerated by means of the combustion energy in an internal-combustion engine operation VM1 to the set idling speed $n_z$ and reaches a stable course at the point in time t3.

During a cold starting operation, the maximal air or mixture temperature in the cylinder (combustion chamber) will fall because of the low ambient temperature. Particularly in the case of Diesel engines, it can happen that the self-ignition temperature of the fuel is not reached at the end of the compression stroke. As a result the engine possibly cannot be started at all at the starting speed $n_a$. Typical measures for increasing the cold-starting capability are the reduction of leakages and losses of heat, the increase of the injected or fed fuel quantity as well as diverse systems for the starting aid of the combustion engine or of the internal-combustion engine, such as a heater plug ("preheating"). However, this measure for improving the starting capability will simultaneously lead to an emission problem. The reason is that, as a result of the high quantity of fuel and the low temperature, the combustion takes place in an incomplete manner. This has the result that many particulates and hydrocarbons occur as products of the incomplete combustion. When the air ratio (ˆ,lambda) falls below the so-called soot limit (at ˆ≈1.2), the particulate emission will rise superproportionally.

In addition, several systems exist for a pneumatic starting aid of an internal-combustion engine by means of compressed air. In one case, the compressed air can drive the turbine of a pneumatic starter motor. In another case, the compressed air can be introduced directly into one or more cylinders during the power cycle in order to pneumatically accelerate the crankshaft. For example, several industrial-scale Diesel engines (such as marine diesel engines or stationary systems for generating emergency power) have a pneumatic starting system consisting of an air compressing device, a compressed-air reservoir, a pneumatic distributor and starter valves. The compressed air generated by an air compressor is stored in one or more compressed-air reservoirs provided for the pneumatic starter. The pneumatic distributor will then take over the task of distributing the compressed air from the compressed-air reservoir to the respective starter valves in the cylinder head of the internal-combustion engine. By way of the starter valves, the compressed air is admitted into the cylinders in order to drive the respective pistons from the top dead center in a downward motion (while the pistons are upright) to the bottom dead center. During the subsequent upward motion of the respective piston, the expanded air is discharged through the normal exhaust valves. The acceleration of the crankshaft takes place purely pneumatically up to the ignition of the engine.

In the case of hybridized vehicles having an additional driving system, a starter (starter motor) is no longer necessary. An electric motor in the hybrid drive train takes over the starting aid for the combustion engine. In addition, the higher-power electric motor is capable of accelerating the combustion engine directly up to its idling speed.

International Patent Document WO-2006/089779 describes a device which takes compressed air from the compressed-air system of a vehicle and briefly blows it into the fresh-air supply system of a piston combustion engine with turbocharging in order to avoid the so-called "turbo-lag". This so-called "pneumatic booster system" (PBS) forms a device for a process for improving the accelerating performance of the piston internal-combustion engine with turbocharging.

It is therefore an object of the present invention to provide an improved process for starting an internal-combustion engine.

A further object consists of creating an internal-combustion engine having a starting-aid device.

According to one aspect of the invention, additional air from an inlet gas supply device, which is provided for a brief blowing-in of air for eliminating the so-called turbo-lag, is blown into the intake pipe when starting the internal-combustion engine.

Accordingly, a process for starting an internal-combustion engine, particularly a Diesel engine, having an exhaust gas turbocharger and an inlet gas supply device having at least one compressed-air reservoir, which is connected with an intake pipe of the internal-combustion engine, is provided, whereby, during the starting of the internal-combustion engine, additional air is blown from the inlet gas supply device into the intake pipe until a speed of the internal-combustion engine reaches a previously definable idling speed.

Such a starting aid formed by the so-called pneumatic booster system additionally provides the internal-combustion engine with the advantages of improving the cold-starting capability for the inner-engine emission reduction and also for implementing a start-stop function.

The already existing infrastructure of the PBS system can be utilized for efficiently and rapidly starting the internal-combustion engine while its emissions are low. By means of an electronic control and an intelligent communication with the engine system, various processes ranging from a pneumatic starting aid to a purely pneumatic start can be implemented by means of the PBS.

This can be provided in a first embodiment in that the following process steps are carried out:

(S1) Driving the internal-combustion engine in a starting device operation by means of an electric starter until the internal-combustion engine reaches a starting speed;

(S2) igniting the fed ignitable fuel-air mixture when the starting speed is reached; and (S3) blowing in additional air from the inlet gas supply device and increasing the speed of the internal-combustion engine in an internal-combustion engine operation until a speed of the internal-combustion engine reaches a previously definable idling speed.

After the igniting, the internal-combustion engine is acted upon by the additional air, whereby, despite a high injection quantity of fuel, as a result of the additional air, the air ratio reaches a clearly higher value than in the state of the art. Hydrocarbon and particulate emissions are thereby lowered.

In a second embodiment, it is provided that the following process steps are carried out:

(S1) Driving the internal-combustion engine by means of an electric starter in a first starting device operation until the internal-combustion engine reaches a previously definable intermediate speed;

(S2) driving the internal-combustion engine by blowing in additional air from the inlet gas supply device and increasing the speed of the internal-combustion engine in a second starting device operation until a speed of the internal-combustion engine reaches a previously definable idling speed; and (S3) igniting a fed ignitable fuel-air mixture when the previously definable idling speed is reached.

No fuel is injected during the pneumatic start. The internal-combustion engine is accelerated to the idling speed; only then will the ignition take place. The "dirty starting phase" is completely bypassed. No harmful exhaust gases are generated in the process.

The following process steps are carried out in a third embodiment:

(S1) Driving the internal-combustion engine in a starting device operation by blowing in additional air from the inlet gas supply device and increasing the speed of the internal-combustion engine until a speed of the internal-combustion engine reaches a previously definable idling speed; and (S2) igniting a fed ignitable fuel-air mixture when the previously definable idling speed is reached.

In this case, the PBS system, which is present anyhow, is utilized as an electronically controlled additional air system, in which case the required infrastructure is available free of charge and can isochronously intelligently (for example, by a CAN bus linkage) in a simple manner be linked with the engine timing gear. In this case, only a variable valve gear is still required which is also already present in many cases. Additional components for generating and controlling the compressed air are eliminated because they are also already present. The PBS system is used for the pneumatic engine start and the starting aid respectively as well as for improving the transient performance.

As a result, during the blowing-in of additional air from the inlet gas supply device, a negative valve overlap of the valves of the internal-combustion engine can be adjusted by the variable valve gear. As a result, it is prevented that the blown-in additional air escapes to a certain extent.

In a further development, it is provided that, after the previously definable idling speed has been reached, the blowing-in of additional air from the inlet gas supply device can be adjusted after a previously definable time segment. In addition, the volume of the blown-in additional air can be adjusted by the inlet gas supply device. Thus, in the intake phase, at the idling speed or the increased idling speed.

During the blowing-in of additional air from the inlet gas supply device, a flap is closed in order to prevent a return flow of the additional air into a compressor of the exhaust gas turbocharger. As a result, losses of pressure and volume of the additional air can be further reduced.

It is also provided that, at predefinable points in time and/or when its aid is required, the electric starter can be switched on. A further aid function is thereby provided. The starter may also be available as an emergency starter when, for example, no or no sufficient compressed air is available.

An internal-combustion engine, particularly a Diesel engine, having an exhaust gas turbocharger comprises an inlet gas supply device in an intake pipe of the internal-combustion engine; a compressed-air system having at least one compressed-air reservoir that can be connected with the inlet gas supply device; an engine timing gear and a starting-aid device having a control device, the starting-aid device being constructed for controlling the inlet gas supply device for blowing in additional air when starting the internal-combustion engine for implementing a process for starting an internal-combustion engine. This process may be the above-described process.

The starting-aid device comprises a control device which, as software, is a component of the engine timing gear. This results in no additional space requirement.

In an alternative embodiment, the starting-aid device may have a separate control device that is connected with the engine timing gear. Advantageously, retrofitting of existing installations is therefore also possible.

In another embodiment, it is contemplated for the engine timing gear to be constructed for a start-stop operation of the internal-combustion engine. The advantages of the starting-aid device and of the above-described process can therefore be used extensively.

This can be implemented, for example, in that the engine timing gear communicates with a control of the inlet gas supply device, the control device of the starting-aid device and with a clutch/transmission control for implementing the start-stop operation of the internal-combustion engine by way of an electric interface. The electric interface may, for example, be an interface of a bus system, such as a CAN bus.

The advantages and potential for cold, as well as also warm, starting processes resulting from the above-described process and the above-described internal-combustion engine are the following:

(1) Improvement of the (cold) starting capability of internal-combustion engines per se.

(2) Reduction of costs of an electric starter because it can have a smaller design for extreme starting situations.

(3) Reduction of emissions during the starting operation; thereby in turn
  (a) reduction of the extent of the exhaust gas aftertreatment,
  (b) observing of tightened transient exhaust gas regulations.

(4) Reduction of the fuel consumption during the starting operation.

(5) Acceleration of the starting operation, thereby in turn
  (a) making a start-stop system possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
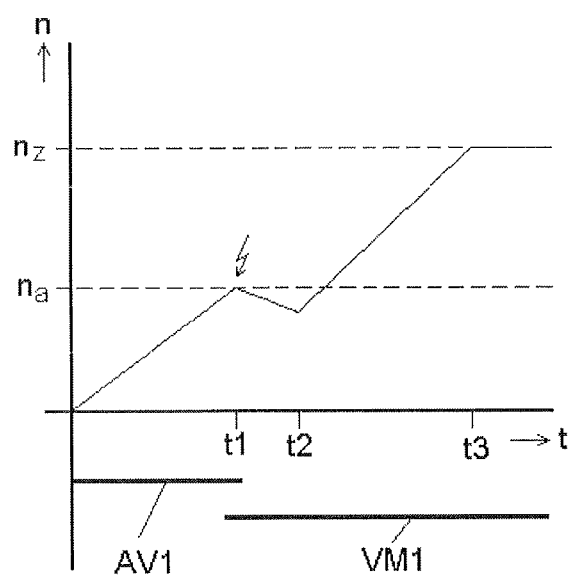
FIG. 1 is a graphical diagram of a course of the rotational speed when starting an internal-combustion engine according to the state of the art.

FIG. 1 was explained above.

Figure 2:
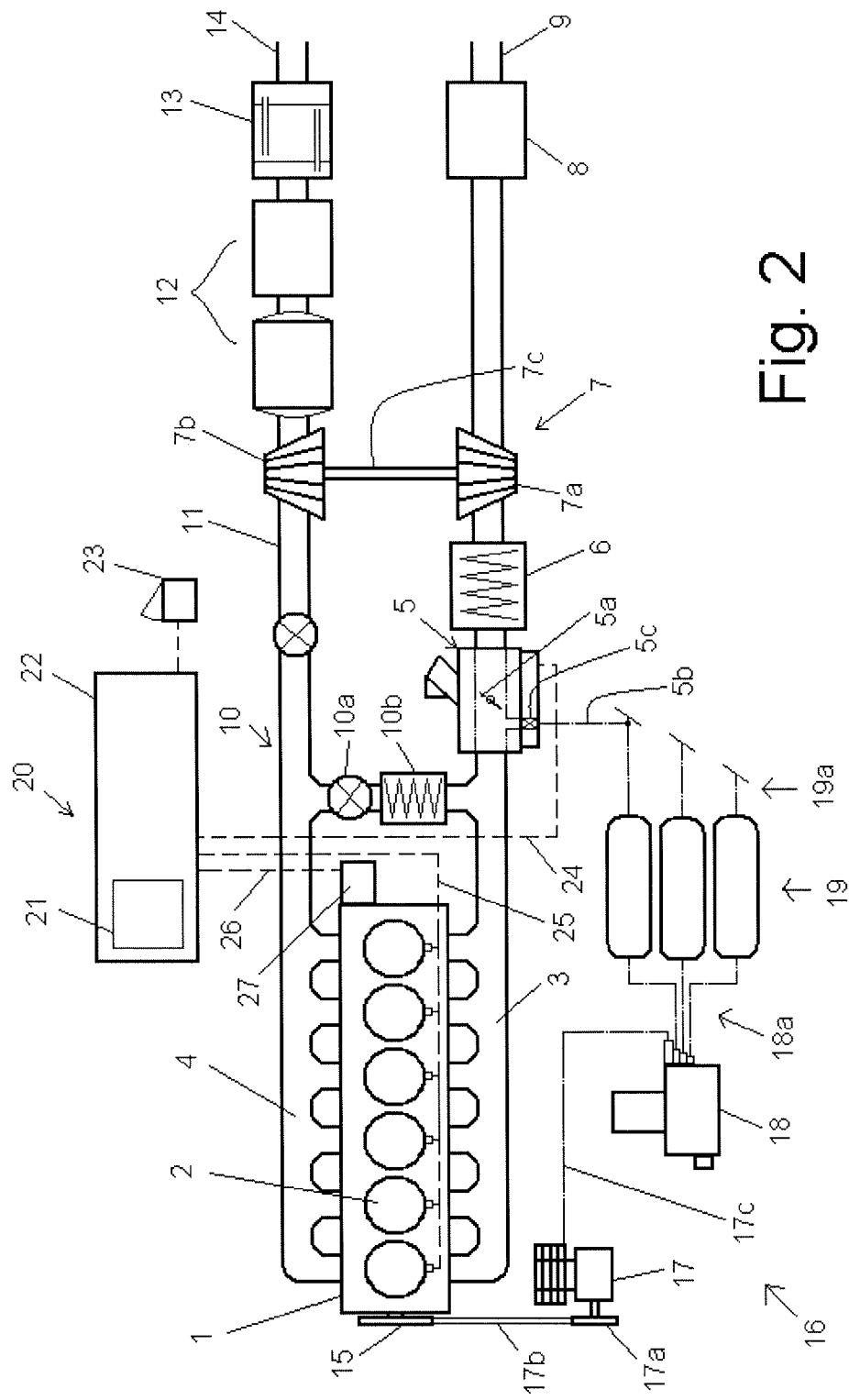
FIG. 2 is a block diagram of an exemplary internal-combustion engine according to the invention having a starting-aid device.

FIG. 2 is a block diagram of an internal-combustion engine 1 with an embodiment of a starting-aid device 20.

The internal-combustion engine 1 is equipped with an exhaust gas turbocharger 7 and an exhaust gas recirculation system 10 and in this case has six cylinders 2, which can be connected by way of valves (not shown) with an intake pipe 3 and an exhaust pipe 4 (also called intake manifold and exhaust manifold). The internal-combustion engine is, for example, a Diesel engine of a vehicle. The intake pipe 3 is connected in series with an inlet gas supply device 5, a charge air cooler 6, a compressor 7a of the exhaust gas turbocharger 7, an air filter 8 and an air inlet 9. Furthermore, a compressed-air system 16 is assigned to the internal-combustion engine 1.

The exhaust pipe 4 is connected with the exhaust gas recirculation system 10 and an exhaust pipe 11. The exhaust gas recirculation system 10 is provided with a recirculation valve 10a and a recirculation cooler 10b, leads in the flow direction behind the inlet gas supply device 5 into the intake pipe 3 and will not be explained in detail.

The exhaust gas pipe 11 connects the exhaust pipe 4 with an exhaust gas turbine 7b of the exhaust gas turbocharger 7 which, in the flow direction of the exhaust gas, is connected with an emission control system 12 not explained in detail, a muffler 13 and an exhaust gas outlet 14.

The compressed-air system 16 is used, for example, for supplying a pneumatic brake system of the pertaining (not shown) vehicle and, in this case, has a compressor 17, a compressed-air regulator 18, at least one compressed-air reservoir 19 and at least one compressed-air circuit 19a. The compressor 17 is driven by an output drive 15 of the internal-combustion engine 1 by way of a driving device 17b, such as a V-belt, and a drive 17a and compresses air from the atmosphere which it feeds to the pressure regulator 18 by way of a pressure pipe 17c. The compressed-air regulator 18 is connected by way of at least one feed line 18a with the at least one pressure vessel 19 and regulates the compressed-air feeding for maintaining the pressure in the pressure vessel 19 in a manner not described in detail. At a compressed-air circuit 19a, a compressed-air feeding pipe 5b is connected to the inlet gas supply device 5 by way of a feeding valve 5c. The method of operation of the inlet gas supply device 5 is described in detail in International Patent Document WO-2006/089779.

Furthermore, the internal-combustion engine 1 is connected with an engine timing gear 22 by way of control lines illustrated by broken lines. In addition to other not shown equipment, a gas pedal 23 is connected to the engine timing gear 22. An inlet gas control line 24 connects the engine timing gear 22 with the inlet gas supply device 5. An engine control line 25 establishes connections of the engine timing gear 22 with the injection devices and valves of the internal-combustion engine 1. By way of a starter control line 26, a starter 27 of the internal-combustion engine 1 is connected with the engine timing gear 22. These control lines 24 to 26 may also be components of a vehicle bus system, for example, a CAN.

In addition, a starting-aid device 20 is provided which, in this embodiment, has a control device 21 which is arranged in the engine timing gear 22 and, for example, forms a component of the control software. The control device 21 can naturally also be constructed as a separate add-on unit that is connected in a suitable manner with the engine timing gear 22.

By use of the starting-aid device 20, three different possibilities are created for starting the internal-combustion engine 1, which will be described in the following.

Figure 3:
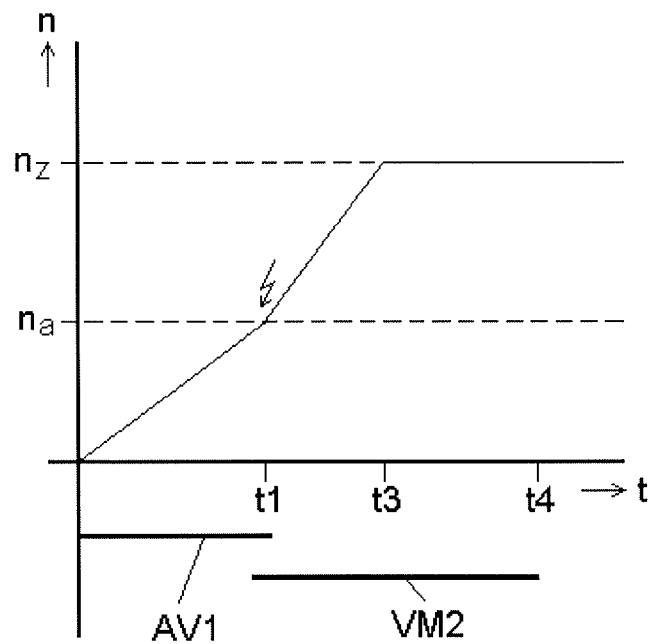
FIG. 3 is a graphical diagram of a course of the rotational speed when starting the internal-combustion engine with the device of FIG. 2 according to a first embodiment of a process of the invention.

For this purpose, FIG. 3 shows a diagram of a course n of the rotational speed when starting the internal-combustion engine 1 with the starting-aid device 20 of FIG. 2 according to a first embodiment of a process according to the invention.

The internal-combustion engine 1 is driven by the electric starter 27 in a first starting device operation AV1 until it reaches the starting speed $n_a$ at the point in time t1. Then an ignition takes place by injecting an ignitable fuel-air mixture, in which case the rotational speed n of the internal-combustion engine 1 in an internal-combustion engine operation VM2 together with additional air from the inlet gas supply device 5 is increased until a target speed $n_z$ is reached at the point in time t3. The additional air is blown as compressed air from the inlet gas supply device 5 into the intake section, i.e. into the intake pipe 3 of the internal-combustion engine 1, in that the feeding valve 5c is opened and the flap 5a of the inlet gas supply device 5 is closed. As a result, the air available for the combustion is increased immediately depending on the duration and volume of the blowing-in of air starting at the point in time t1 to a definable point in time t4 for switching off the additional air. In addition, the blown-in additional air as compressed air pneumatically boosts the acceleration of the crankshaft of the internal-combustion engine. A brief drop of the engine speed n (see FIG. 1, point in time t2) will no longer occur. The starting phase is clearly reduced. In this case, the point in time of the blowing-in of the additional air is decisive. Despite the high injection volume of the fuel, the air ratio number ^ can reach a clearly higher value than without this pneumatic starting aid. Since the main influential parameter for the hydrocarbon and particulate emission is the air ratio number ^, a higher air excess causes a lowering of the hydrocarbon and particulate emissions.

Figure 4:
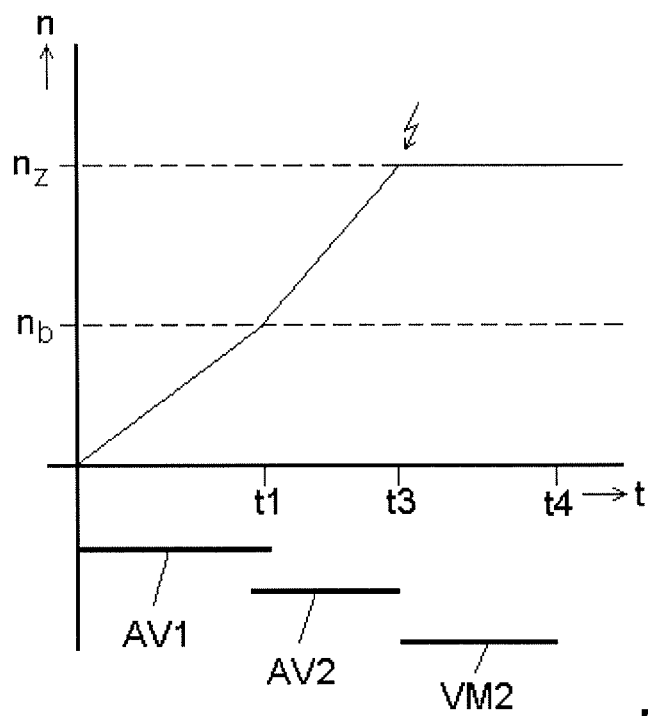
FIG. 4 is a graphical diagram of a course of the rotational speed when starting the internal-combustion engine with the device of FIG. 2 according to a second embodiment of a process of the invention.

FIG. 4 is a diagram of a course of the rotational speed n when starting the internal-combustion engine 1 with the starting-aid device 20 of FIG. 2 according to a second embodiment of a process of the invention.

The electric starter 27 drives the internal-combustion engine 1 in a first starting device operation AV1 until it reaches a previously definable intermediate speed $n_b$ at the point in time t1. Neither fuel is injected, nor an ignition operation is carried out. Subsequently, the internal-combustion engine 1 is driven purely pneumatically in a second starting device operation AV2 by additional air from the inlet gas supply device 5 until a target speed $n_z$ is reached at the point in time t3. This means that no fuel is injected during this pneumatic start between points in time t1 to t3. As described above, the additional air is continuously blown in from the inlet gas supply device 5 out of the pressure reservoir/pressure reservoirs 19 into the intake pipe 3 of the internal-combustion engine 1. This compressed air is introduced into those cylinders whose intake valves are open. In this case, attention should be paid to the fact that a positive valve overlap should be avoided so that the compressed air blown in through the intake valves of the cylinders 2 does not immediately escape again through the exhaust valves of these cylinders 2. A negative valve overlap can be implemented, for example, by a variable valve gear. This can also be carried out by the valve gear 22 triggered by the starting-aid device 20 by way of the engine control line 23. The additional air or compressed air from the inlet gas supply device 5 will then act upon the respective piston of the pertaining cylinder 2 and accelerate the crankshaft as well as the flywheel of the internal-combustion engine 1. The blowing-in of the additional air will end only when the target speed of the starting operation or the idling speed $n_z$ of the internal-combustion engine 1 is reached, which at the earliest takes place at the point in time t3. This is followed by the ignition or the injection of the ignitable fuel-air mixture in an internal-combustion engine operation VM2. The blowing-in of additional air can still be continued to a definable point in time t4 until, for example, an air excess is no longer necessary or the idling speed can be taken up with the lowest emissions. As a result, the "dirty starting phase" with very high emissions is completely bypassed by means of the starting-aid device 20 with the help of the pneumatic aid of the inlet gas supply device 5. In this case, no harmful gases are generated.

Figure 5:
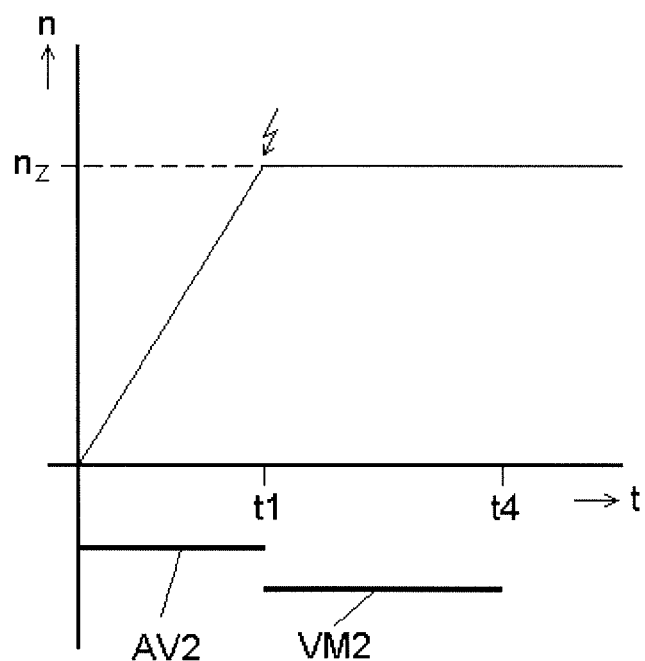
FIG. 5 is a graphical diagram of a course of the rotational speed when starting the internal-combustion engine with the device of FIG. 2 according to a third embodiment of a process of the invention.

FIG. 5 is a diagram of a course of the rotational speed n when starting the internal-combustion engine 1 with the starting-aid device 20 of FIG. 2 according to a third embodiment of a process of the invention.

In this embodiment, the internal-combustion engine 1 is driven purely pneumatically in a second starting device operation AV2 by additional air from the inlet gas supply device 5 until a target speed $n_z$ is reached at the point in time t1. Then the ignition or the injection of the ignitable fuel-air mixture takes place in an internal-combustion engine operation VM2. The blowing-in of additional air can still continue to a definable point in time t4. In this case, it is also conceivable that the blown-in additional air can be reduced in its volume by means of the inlet gas supply device 5 if the feeding valve 5c is constructed, for example, as a control valve.

The process for starting the internal-combustion engine 1 with the starting-aid device 20 utilizes the already existing pneumatic infrastructure of the PBS system with the inlet gas supply device 5 in order to efficiently and rapidly start the internal-combustion engine 1 with low emissions. As a result of the intelligent communication connection of the control device 21 of the starting-aid device 20 with the engine timing gear 22, which together from a completely electronic control, the different methods of the pneumatic starting aid up to a purely pneumatic start can be implemented by means of the PBS system. A difference consists of whether a combustion already takes place at the beginning of the blowing-in of compressed air or when the target speed $n_x$ is reached.

The invention is not limited to the above-described embodiments.

Thus, it is contemplated that the above-described starting processes of the internal-combustion engine 1 can be optimized by an intelligent control and interaction of the PBS system with the inlet gas supply device 5, its flap 5a as well as the electric starter 27. For example, the flap 5a can be closed at the start of the activation of the inlet gas supply device 5, i.e. at the beginning of the blowing-in of additional air, in order to prevent a return flow of the additional air into the compressor 7a of the exhaust gas turbocharger 7. The flap 5a can then be opened when a certain pressure is reached in the flow direction behind the compressor 7a. This can be detected by way of pressure transducers, for example, in the compressor 7a and/or in the inlet gas supply device 5.

In the case of a start-stop system, the starting-aid device 20 can be included, in which case, depending on the operating condition of the internal-combustion engine 1, the appropriate embodiment of the process according to the invention can be used.

The interaction with a start-stop system will be briefly described in the following by way of an example.

The inlet gas supply device 5 has a control unit—a so-called PBS control—which is not shown in detail and is constructed as a separate control unit or is implemented as a component part in the engine timing gear 22. This control unit of the inlet gas supply device 5 may be networked, for example, by means of an electric interface, such as a CAN bus, with other drive control devices and correspondingly communicate with them. Other drive control devices are, among others, the control device 21 of the starting-aid device 20 and a clutch/transmission control.

Before the starting operation of the internal-combustion engine 1, the PBS control or the engine timing gear 22 sends a signal by way of the electric interface to a clutch/transmission control which is part of a transmission in the drive train of a vehicle equipped with the internal-combustion engine. The clutch control and the transmission control can be implemented in a single control device as well as in two separate control devices. For enabling the internal-combustion engine 1 to start, the clutch control initiates that the clutch of an automated manual transmission, the converter lockup clutch of a converter transmission or the two clutches of a double-clutch transmission are opened before the start of the internal-combustion engine 1. Naturally, other types of transmissions or clutches may be used. In addition, if a gear is engaged, the transmission control will switch the engaged gear off again. The clutch/transmission control device will then send an enable signal by way of the electric interface back to the PBS control or the engine timing gear 22 for enabling the starter of the internal-combustion engine 1 by means of the control device 21 of the starting-aid device 20 according to the above described processes.

By way of the electric interface and the coordinated cooperation of the internal-combustion engine 1, the inlet gas supply device 5 with the PBS control, the clutch and the transmission, the starting and the start-stop function of an internal-combustion engine 1 of a vehicle can be implemented in a simple manner by means of the inlet gas supply device 5 with the PBS control.

It is further contemplated that the electric starter 27 is switched on by the starting-aid device 20 in a targeted manner at the moment when its additional "aid" makes sense.

Even if only a purely pneumatic starting takes place as in the third embodiment, the electric starter 27 can be used as an emergency starter if no compressed air or no sufficient compressed air is present.

LIST OF REFERENCE SYMBOLS

1 Internal-combustion engine
2 cylinder
3 intake pipe
4 exhaust pipe
5 inlet gas supply device
5a flap
5b compressed-air feeding pipe
5c feeding valve
6 charge air cooler
7 exhaust gas turbocharger
7a compressor
7b exhaust gas turbine
7c shaft
8 air filter
9 air inlet
10 exhaust gas recirculation system
10a recirculation valve
10b recirculation cooler
12 emission control system
13 muffler
14 exhaust gas outlet
15 output
16 compressed-air system
17 compressor
17a drive
17b driving device
17c pressure pipe
18 compressed-air regulator
18a feed lines
19 compressed-air reservoir
19a compressed-air circuit
20 starting-aid device
21 control device
22 engine timing gear
23 gas pedal
24 inlet gas control line
25 engine control line
26 starter control line
27 starter
AV1, AV2 starting device operation
n rotational speed
$n_a$ starting speed
$n_b$ definable intermediate rotational speed
$n_z$ target speed
t time
t1 . . . t4 points in time
VM1, VM2 internal-combustion engine operation The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for starting an internal-combustion engine having an exhaust gas turbocharger and an inlet gas supply device with at least one compressed-air reservoir coupled with an intake pipe of the internal-combustion engine, the process comprising the acts of:
    during a starting of the internal-combustion engine, blowing additional air from the inlet gas supply device into the intake pipe; and
    wherein the blowing of the additional air from the inlet gas supply device into the intake pipe during the starting of the internal-combustion engine occurs at least until a rotational speed of the internal-combustion engine reaches a previously defined idling speed.

2. The process according to claim 1, further comprising the acts of:
    driving the internal-combustion engine in a starting device operation via an electric starter until the internal-combustion engine reaches a starting speed;
    igniting a fed ignitable fuel-air mixture when the starting speed is reached; and blowing in the additional air from the inlet gas supply device and increasing the rotational speed of the internal-combustion engine in an internal-combustion engine operation until the rotational speed reaches the previously defined idling speed.

3. The process according to claim 1, wherein the internal-combustion engine further comprises a variable valve gear, the process further comprising the acts of:
    driving the internal-combustion engine via an electric starter in a first starting device operation until the internal-combustion engine reaches a previously defined intermediate speed;
    driving the internal-combustion engine in a second starting device operation in which the additional air is blown-in from the inlet gas supply device and the rotational speed of the internal-combustion engine is increased until the rotational speed reaches the previously defined idling speed; and
    igniting a fed ignitable fuel-air mixture when the previously defined idling speed is reached.

4. The process according to claim 3, further comprising the act of:
    during the blowing-in of the additional air from the inlet gas supply device, adjusting a negative valve overlap of valves of the internal-combustion engine via the variable valve gear.

5. The process according to claim 1, wherein the internal-combustion engine further comprises a variable valve gear, the process further comprising the acts of:
    driving the internal-combustion engine in a starting device operation by blowing in the additional air from the inlet gas supply device and increasing the rotational speed until the rotational speed of the internal-combustion engine reaches the previously defined idling speed; and
    igniting a fed ignitable fuel-air mixture when the previously defined idling speed is reached.

6. The process according to claim 5, further comprising the act of:

during the blowing-in of the additional air from the inlet gas supply device, adjusting a negative valve overlap of valves of the internal-combustion engine via the variable valve gear.

7. The process according to claim 1, wherein after reaching the previously defined idling speed, the method further comprises the act of adjusting the blowing-in of the additional air from the inlet gas supply device after a previously defined time segment.

8. The process according to claim 1, further comprising the act of adjusting a volume of the blown-in additional air via the inlet gas supply device.

9. The process according to claim 1, wherein during the blowing-in of the additional air from the inlet gas supply device, the method further comprises the act of closing a flap in order to prevent a return flow of the additional air into a compressor of the exhaust gas turbocharger.

10. The process according to claim 1, wherein, at predefinable points-in-time and/or when required, the electric starter is switched on.

11. The process according to claim 1, wherein the internal-combustion engine is a diesel engine.

12. The process according to claim 1, wherein the blowing of the additional air from the inlet gas supply device into the intake pipe begins at a point in time that is either before, or at a time at which the internal-combustion engine reaches its starting speed, such that the internal-combustion engine does not experience a drop in rotational speed during the process for starting thereof.

13. A process for starting an internal-combustion engine having an exhaust gas turbocharger, an inlet gas supply device with at least one compressed-air reservoir coupled with an intake pipe of the internal-combustion engine, and a variable valve gear, the process comprising the acts of:
    during a starting of the internal-combustion engine, blowing additional air from the inlet gas supply device into the intake pipe;
    driving the internal-combustion engine via an electric starter in a first starting device operation until the internal-combustion engine reaches a previously defined intermediate speed;
    driving the internal-combustion engine in a second starting device operation in which the additional air is blown-in from the inlet gas supply device and the rotational speed of the internal-combustion engine is increased until the rotational speed reaches the previously defined idling speed; and
    igniting a fed ignitable fuel-air mixture when the previously defined idling speed is reached, wherein the blowing of the additional air from the inlet gas supply device into the intake pipe during the starting of the internal-combustion engine occurs at least until a rotational speed of the internal-combustion engine reaches a previously defined idling speed.

14. An internal-combustion engine, comprising:
    an exhaust gas turbocharger having an inlet gas supply device in an intake pipe of the internal-combustion engine;
    a compressed air system having at least one compressed-air reservoir connectable with the inlet gas supply device;
    an engine timing gear; and
    a starting-aid device having a control device; wherein
        the starting-aid device is operatively configured for controlling the inlet gas supply device for blowing-in additional air when starting the internal-combustion engine in order to affect a starting process of the internal-combustion engine, and
        the blowing-in of the additional air from the inlet gas supply device begins at a point in time that is either before, or at a time at which the internal-combustion engine reaches its starting speed, and continues at least until a rotational speed of the internal combustion engine reaches a previously defined idling speed such that the internal-combustion engine does not experience a drop in rotational speed during the starting process thereof.

15. The internal-combustion engine according to claim 14, further comprising a variable valve gear.

16. The internal-combustion engine according to claim 15, further comprising an electric starter for the internal-combustion engine.

17. The internal-combustion engine according to claim 14, wherein the control device of the starting-aid device is operatively configured as software that is a component of the engine timing gear.

18. The internal-combustion engine according to claim 14, wherein the control device of the starting-aid device is a separate component connected with the engine timing gear.

19. The internal-combustion engine according to claim 14, wherein the engine timing gear is operatively configured for a start-stop operation of the internal-combustion engine.

20. The internal-combustion engine according to claim 19, further comprising an electric interface through which the engine timing gear communicates with: a control of the inlet gas supply device, the control device of the starting-aid device, and a clutch/transmission control implementing the start-stop operation of the internal-combustion engine.

* * * * *